Oct. 15, 1957 H. G. GENTRY 2,809,486
MEANS FOR SECURING WRAPPER BLANKS ABOUT ARTICLE PACKAGES
Filed June 25, 1956 8 Sheets-Sheet 2

INVENTOR.
HERMOND G. GENTRY
BY
Parrott & Richards
ATTORNEYS

Oct. 15, 1957 H. G. GENTRY 2,809,486
MEANS FOR SECURING WRAPPER BLANKS ABOUT ARTICLE PACKAGES
Filed June 25, 1956 8 Sheets-Sheet 3

INVENTOR.
HERMOND G. GENTRY
BY
*Parrott & Richards*
ATTORNEYS

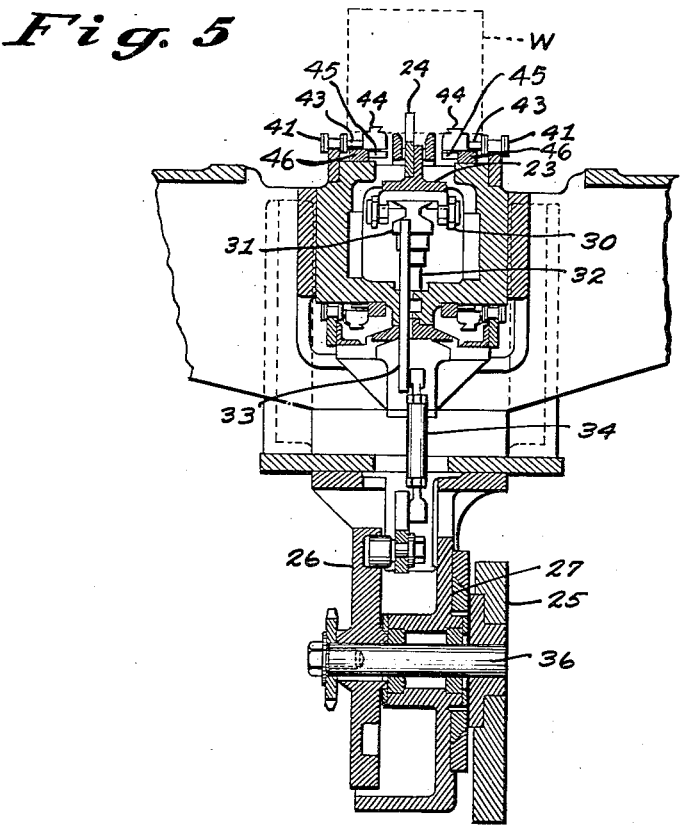
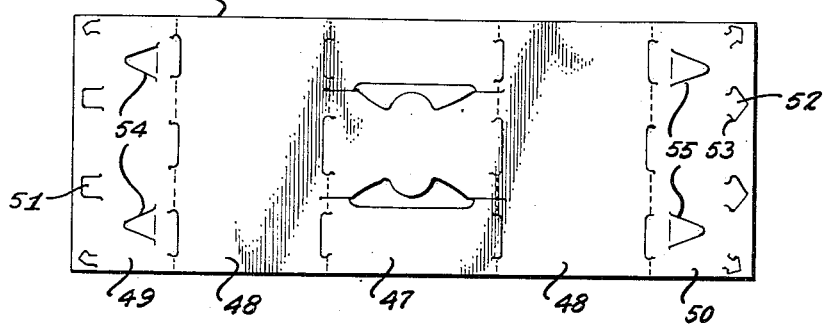

Oct. 15, 1957          H. G. GENTRY          2,809,486
MEANS FOR SECURING WRAPPER BLANKS ABOUT ARTICLE PACKAGES
Filed June 25, 1956          8 Sheets—Sheet 5

INVENTOR.
HERMOND G. GENTRY
BY
*Parrott & Richards*
ATTORNEYS

Oct. 15, 1957 H. G. GENTRY 2,809,486
MEANS FOR SECURING WRAPPER BLANKS ABOUT ARTICLE PACKAGES
Filed June 25, 1956 8 Sheets-Sheet 6
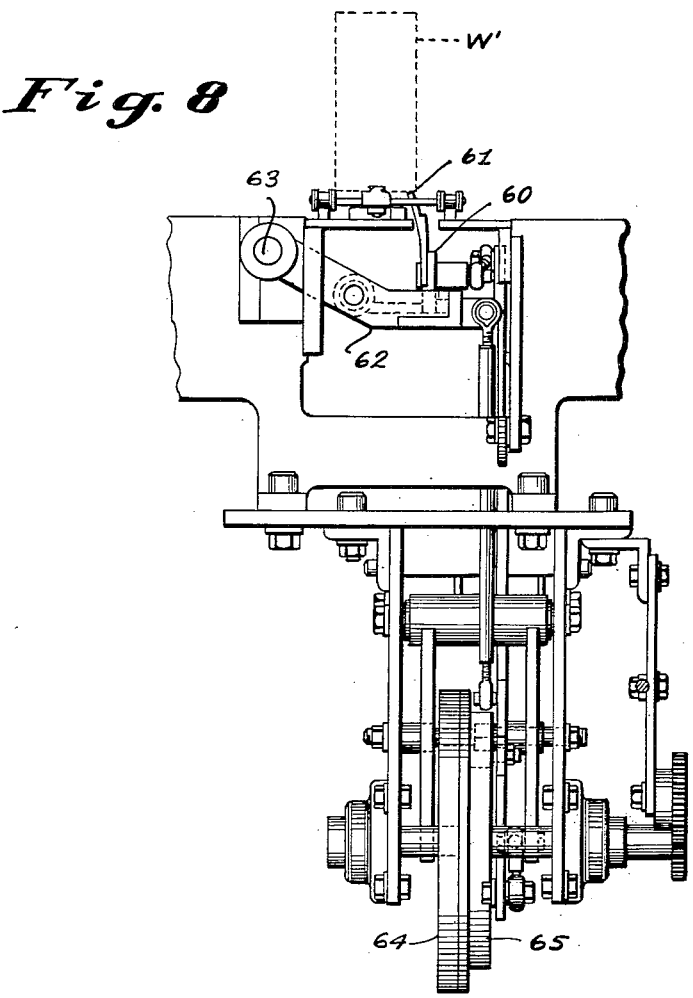
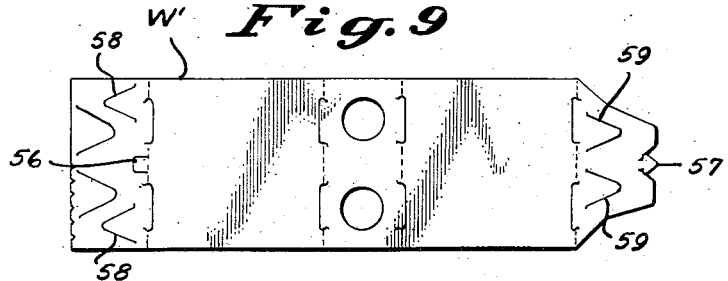
INVENTOR.
HERMOND G. GENTRY
BY
Parrott & Richards
ATTORNEYS

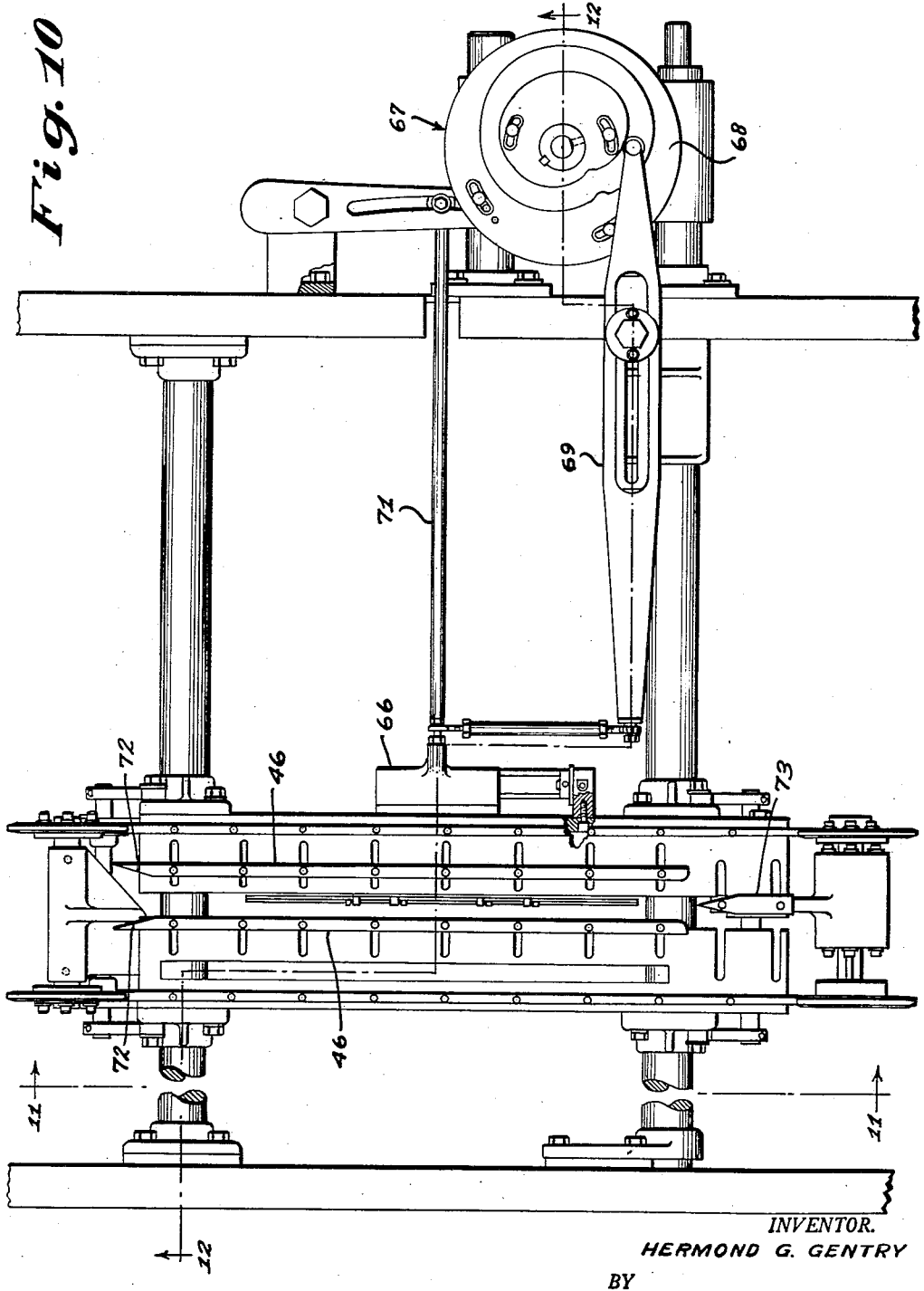

Oct. 15, 1957 H. G. GENTRY 2,809,486
MEANS FOR SECURING WRAPPER BLANKS ABOUT ARTICLE PACKAGES
Filed June 25, 1956 8 Sheets-Sheet 8
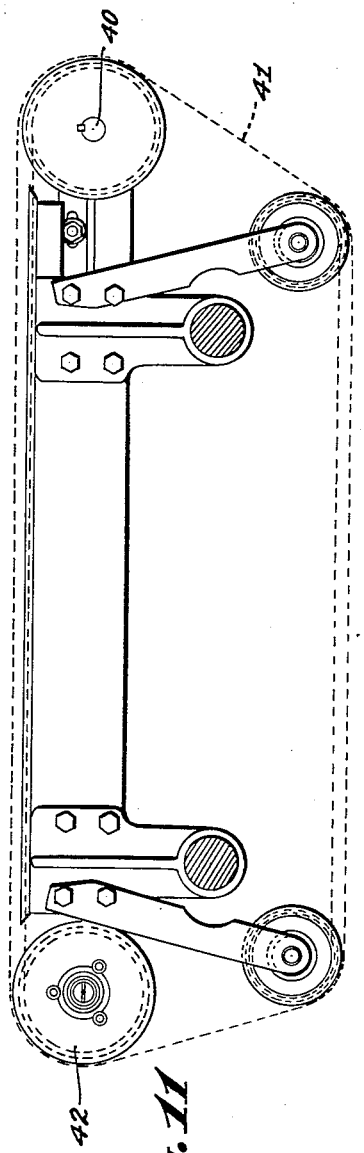
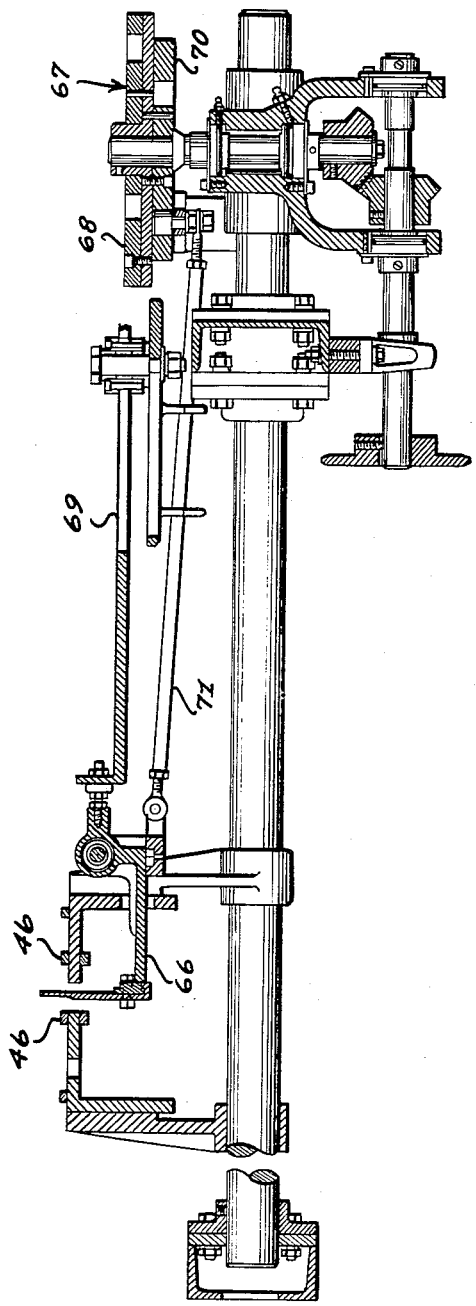
INVENTOR.
HERMOND G. GENTRY
BY
Parrott & Richards
ATTORNEYS

2,809,486

MEANS FOR SECURING WRAPPER BLANKS ABOUT ARTICLE PACKAGES

Hermond G. Gentry, Atlanta, Ga., assignor, by mesne assignments, to Atlanta Paper Company, a corporation of Ohio Application June 25, 1956, Serial No. 593,604

12 Claims. (Cl. 53—376)

This invention relates generally to the packaging of articles, such as cans, in wrapper blanks proportioned to fold over and overlap for securing beneath a package group of articles so as to form an open-ended type of package. More particularly, the present invention relates to means for securing the wrapper blanks tightly about the package groups.

A wrapper blank arranged for forming a package of the type noted above is disclosed in copending application Serial No. 459,918, filed October 4, 1954, now U. S. Patent No. 2,786,572, issued March 26, 1957; and copending application Serial No. 476,650, filed December 21, 1954, now U. S. Patent No. 2,751,730, issued June 26, 1956, discloses in detail the manner in which cans may be packaged in this wrapper blank, together with apparatus for carrying out the packaging operation. Generally characterized, the wrapper blank disclosed in the above noted copending application is proportioned to fold about and overlap for securing beneath a package group of articles, with aligned locking and retaining tabs formed in the overlapping blank portions so that the locking tabs may be pressed inwardly to secure the package, and with apertures further formed in the overlapping blank portions to allow gripping thereof for drawing the blank tight before it is secured.

The present invention provides means for drawing a wrapper blank of this sort tight and securing it about a package group of articles while the package group and wrapper thereon are traveling continuously, as described in detail below in connection with the accompanying drawings, in which:

Fig. 5 is a sectional detail taken substantially on the line 5—5 in Fig. 3;

Fig. 6 is a plan view of a wrapper blank arranged for securing by the operating mechanism illustrated in Figs. 3, 4 and 5;

Fig. 8 is a right end elevation corresponding to Fig. 7;

Fig. 9 is a plan view of a wrapper blank arranged for securing by the locking mechanism illustrated in Figs. 7 and 8;

Fig. 10 is an enlarged plan detail of a further modified form of locking means embodying the present invention;

Fig. 11 is a side elevation detail, partly in section, at substantially the line 11—11 in Fig. 10; and Fig. 12 is a sectional detail taken substantially on the line 12—12 in Fig. 10.

Figure 1:
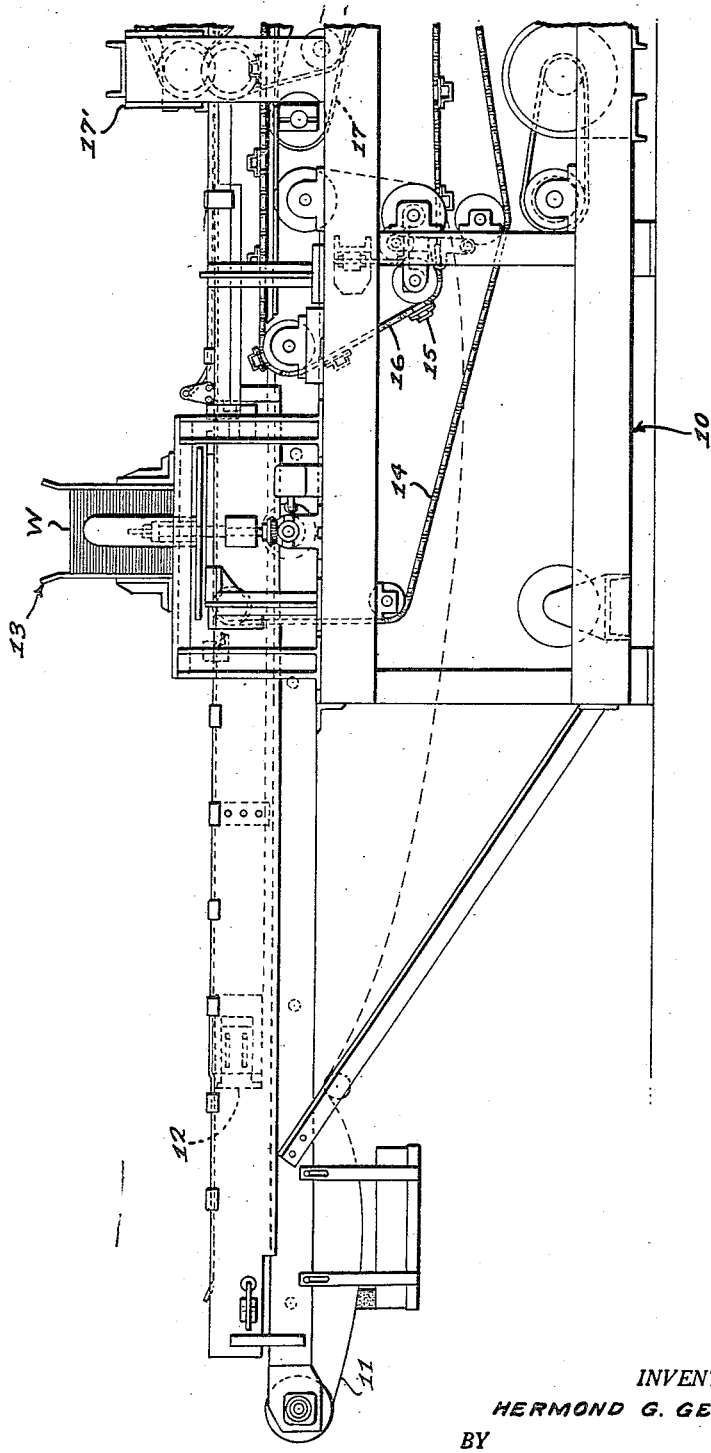
Fig. 1 is a partial side elevation, largely diagrammatic, of a packaging apparatus in which the means of the present invention may be employed.
Figure 2:
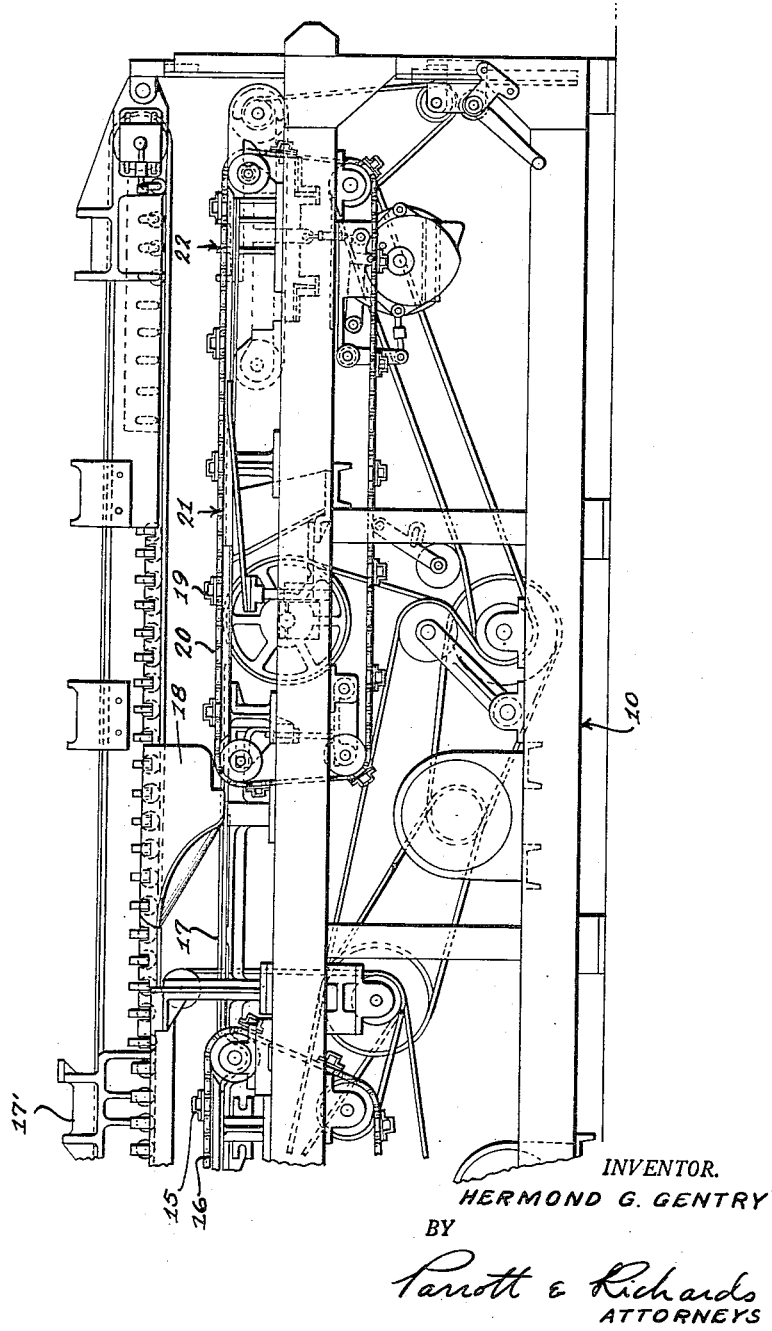
Fig. 2 is a corresponding side elevation of the remainder of the apparatus shown in Fig. 1.

Referring now in detail to the drawings, Figs. 1 and 2 illustrate a packaging apparatus of the type disclosed by the above noted copending application Serial No. 476,650, in which a suitable frame structure 10 is arranged to carry means for: receiving at one end thereof the articles, such as cans, to be packaged; separating these articles into package groups; associating wrapper blanks with each of these package groups; and folding and securing each wrapper blank about its related package group; all while the articles being packaged are maintained traveling continuously toward the other end of the frame structure at which the completed packages are discharged.

The articles to be packaged are received at the left hand end of the frame structure 10, as seen in Fig. 1, on a conveyor 11, preferably of the chain type, arranged to present a flat smooth surface at its upper reach on which the articles may slide when caused to but on which the articles will otherwise follow the conveyor movement so as to be fed into the packaging operation. The conveyor 11 is preferably driven at a rate faster than the rate at which the articles travel subsequently during packaging, so as to maintain a continuous supply of articles feeding thereon to the subsequent packaging means; and a separating means, as indicated at 12, and as disclosed in copending application Serial No. 488,291, filed February 15, 1955, now U. S. Patent No. 2,752,027, issued June 26, 1956, is arranged in relation to the conveyor 11 for separating the articles being fed thereon into two rows.

Above the conveyor 11, and spaced toward its discharge end, a blank feeding means 13, such as is disclosed in copending application Serial No. 593,605, filed June 25, 1956, is arranged to support a stacked supply of the paperboard wrapper blanks W transversely for feeding successively across the top of the articles to be packaged as they are advanced by the conveyor 11. As the wrapper blanks W are fed from the blank feeding means 13 each blank W is successively transferred to the control of feeder chains, indicated in Fig. 1 at 14, located at each side of the conveyor 11 and on which spaced hooks (not shown) are carried to engage the trailing edges of the successively fed blanks W for separate serial feeding thereof in proper packaging alignment with the articles traveling on the conveyor 11.

The upper reaches of the feeder chains 14 are spaced above the conveyor 11 to extend substantially level with the tops of the articles being fed thereon; and, just beyond the blank feeding means 13, the articles being fed on the conveyor 11 are separated into package groups aligned with the blanks W on the feeder chains 14 by means of separating plungers 15 carried on spaced chains 16 (compare Figs. 1 and 2 with Fig. 3) at each side of the conveyor 11 for extension transversely to effect the package group separation and to maintain the separated package groups traveling continuously at the driven speed of the carrying chains 16.

The separated package groups are then transferred from the conveyor 11 onto a pair of feed belts 17 arranged for supporting the respective article rows in the package groups, and the package groups and aligned wrapper blanks W pass under an overhead weighting structure 17' for maintaining the alignment thereof as the separating plungers 15 are withdrawn to allow clearance for downward folding of the wrapper blank W over the sides of the package groups at a first folding station 18.

A second series of separating plungers 19 carried on chains 20 are then extended transversely between the package groups again, with end portions of the wrapper blanks W now extending downwardly below the feed belts 17 for overlapping beneath the package groups. To accomplish this overlapping, the package groups are advanced by the separating plungers 19 from the feed belts 17 through a second folding station at 21, and are then finally carried past a locking station 22 where the overlapped portions of the wrapper blanks W are secured in accordance with the present invention.

Figure 3:
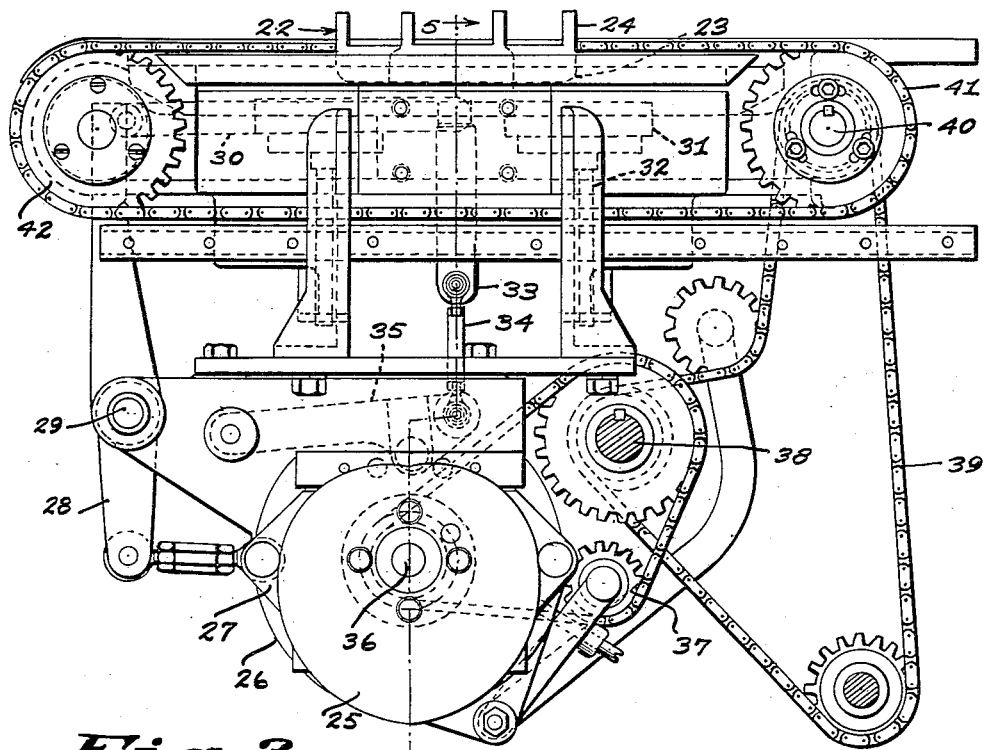
Fig. 3 is an enlarged detail of the mechanism provided at the locking station illustrated in Fig. 2.
Figure 4:
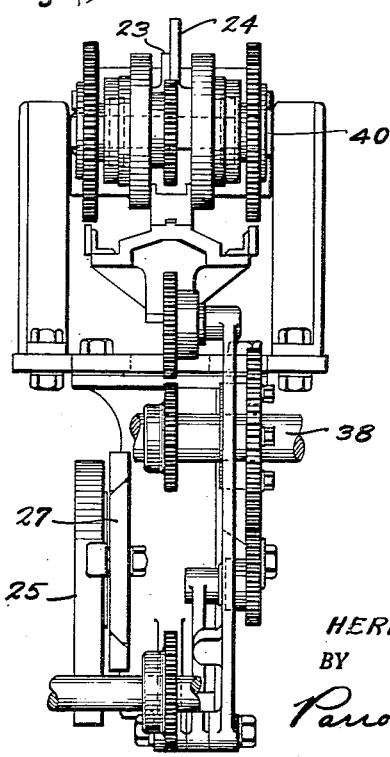
Fig. 4 is a right end elevation corresponding to Fig. 3.

The arrangement of the locking means 22 is illustrated in detail in Figs. 3, 4 and 5 in which it is shown to comprise a crosshead 23 carrying upright finger elements 24 and connected for actuation from cams 25 and 26 to have a cyclic motion imparted thereto by which it is caused to follow the continuous travel of the wrapper enclosed package groups past the locking station 22 while rising to secure the wrapper blanks W thereon by means of the finger elements 24.

The following component of this cyclic motion is effected through a slide follower 27 at the cam 25 that is connected to the lower end of a lever 28 pivoted at 29 and extending upwardly to a connecting bar structure 30 running to the crosshead 23 (compare Figs. 3 and 5) to cause horizontal reciprocation thereof on a slide member 31 arranged on positioning rods 32 that are slidably mounted for vertical movement. The rising component of the cyclic motion is in turn effected by a connecting bar 33 extending downwardly from the slide member 31 for linking at 34 to a lifting arm 35 riding the cam 26.

Both of the actuating cams 25 and 26 are mounted on a common shaft 36 that is driven through a sprocket chain connection at 37 from a shaft 38, which is one of the shafts about which the carrying chains 20 for the second set of separating plungers 19 are carried so as to provide for timed operation of the crosshead 23 in relation to the traveling speed of the separating plungers 19 which feed the wrapper enclosed package groups past the locking station 22, as previously noted.

The plunger chain shaft 38 also has a sprocket chain drive connection 39 running therefrom to a shaft at 40 on which a pair of sprocket chains 41 are trained past the crosshead 23 from idler sprocket wheels at 42. These sprocket chains 41 have the top reaches thereof aligned at each side and just below the bottom of a wrapper enclosed package group as it is fed past the locking station 22 (see Fig. 5), and each chain 41 carries spaced pin elements 43 extending laterally therefrom toward the other chain 41 of the pair and forming slideways on which lug members 44 are mounted for shifting laterally to tighten each wrapper blank W for securing about a package group at the locking station 22, as is explained further below. Each lug member 44 carries a follower roll 45 at its bottom face to ride a cam track 46 by which the lateral shifting thereof for tightening the wrapper blanks W is effected.

A representative form of wrapper blank W, such as is disclosed in the above noted copending application Serial No. 459,918, that may be secured at a locking station 22 arranged according to the present invention as described above, is illustrated in Fig. 6 as comprising a top wall panel 47, a pair of side wall panels 48 foldably hinged at opposite edges of the top wall panel 47, and a pair of bottom wall half laps 49 and 50 foldably hinged at the respective bottom edges of the pair of side wall panels 48 and proportioned to overlap at their extending edge portions to form a rectangular four-sided package having the ends thereof entirely open.

The top wall panel 47, side wall panels 48, and bottom wall half laps 49 and 50 comprise portions of a unitary blank which is generally rectangular in form and is transversely scored to arrange these portions in a foldably hinged series, with all of the portions having an equal length transversely of the blank W that is substantially equal to the length of the package group to be packed therein. The bottom wall half laps 49 and 50 when overlapped form a bottom wall having a width equal to that of the top wall panel 47 and substantially equal to twice the diameter of the articles being packaged so that the wrapper blank W is arranged to enclose a package group formed by two rows of articles as illustrated in the above noted copending application Serial No. 459,918.

The wrapper blank W as arranged in the above noted manner is adapted to be applied to a package group of articles and secured thereon during a packaging operation by an arrangement of the bottom wall half laps 49 and 50 for interlocking engagement to secure the wrapper blank W in place without, if desired, requiring any glue application at the overlapped bottom wall. For this purpose, the inner bottom wall half lap 49 has retaining tabs slit therein as at 51, and the outer bottom wall half lap 50 has related locking tabs 52 slit in the overlapping edge portion thereof.

Both of the retaining tabs 51 and locking tabs 52 are arranged, respectively, to remain hinged to the bottom wall half laps 49 and 50 remotely with respect to the extending edges thereof, so that they fold in opposed relation, and the hinged extent of the retaining tabs 49 is made slightly greater than that of the locking tabs 50 so that the latter may be extended inwardly through the overlapping edge portion of the inner bottom wall half lap 49 at the respective retaining tabs 51 therein. The spacing of the tabs 51 and 52 is such as to locate them at the dead spaces between adjacent articles in a package group, and thereby employ this dead space to provide clearance for manipulating the tabs into locking engagement.

The locking tabs 52 are further specially formed with widened extending end portions forming shoulders thereon as at 53 which are proportioned to overlie the inner bottom wall half lap 49 at each side of the retaining tabs 51 and thereby effect a locking engagement between the bottom wall half laps 49 and 50. Upon extension of the shouldered locking tabs 52 into this locking engagement, the retaining tabs 51 are displaced upwardly at the extending ends of the locking tabs 52 so as to bias the engaged locking tabs 52 in place.

The bottom wall half laps 49 and 50 are each further advantageously formed with apertures 54 and 55 spaced from the ends thereof and from the adjacent side wall panel 48 for location within the diameter of an article packaged in the wrapper W so as to provide clearance at these apertures 54 and 55 for gripping the bottom wall half laps 49 and 50 and holding them in proper overlapping relation while the locking tabs 52 are manipulated into locking engagement, as explained further below.

A package group of articles enclosed in the above described form of wrapper blank W upon being advanced to the locking station 22 by the separating plungers 19 is first carried past the starting end of the top reach of the pair of chains 41 on which the laterally shiftable lug members 44 are spaced. The lug members 44 have the top faces thereof shaped for fitting within the apertures 54 and 55 in the overlapped wrapped blank half laps 49 and 50, and they are spaced on the chains 41 and the chains 41 are timed to cause lug members 44 to rise within these wrapper apertures 54 and 55 at the starting end of the top reaches of chains 41. After the lug members 44 rise within the apertures 54 and 55 they reach the cam tracks 46 and are shifted laterally inward to draw and maintain the wrapper blank W tight about the package group on which it is folded during travel thereof along a substantial portion of the remaining extent of the top reaches of the chains 41, so that the timed actuation of crosshead 23 results in causing the finger elements 24 thereon to rise and press the locking tabs 52 through the inner overlapping half lap 49 at the retaining tabs 51 therein while the wrapper blank W is maintained tight on the package group. Upon securing the locking tabs 52 in this manner the packaging operation is completed and the secured package group is released by the lug members 44 adjacent the opposite end of the top reaches of chains 41 for discharge from the machine.

Figure 7:
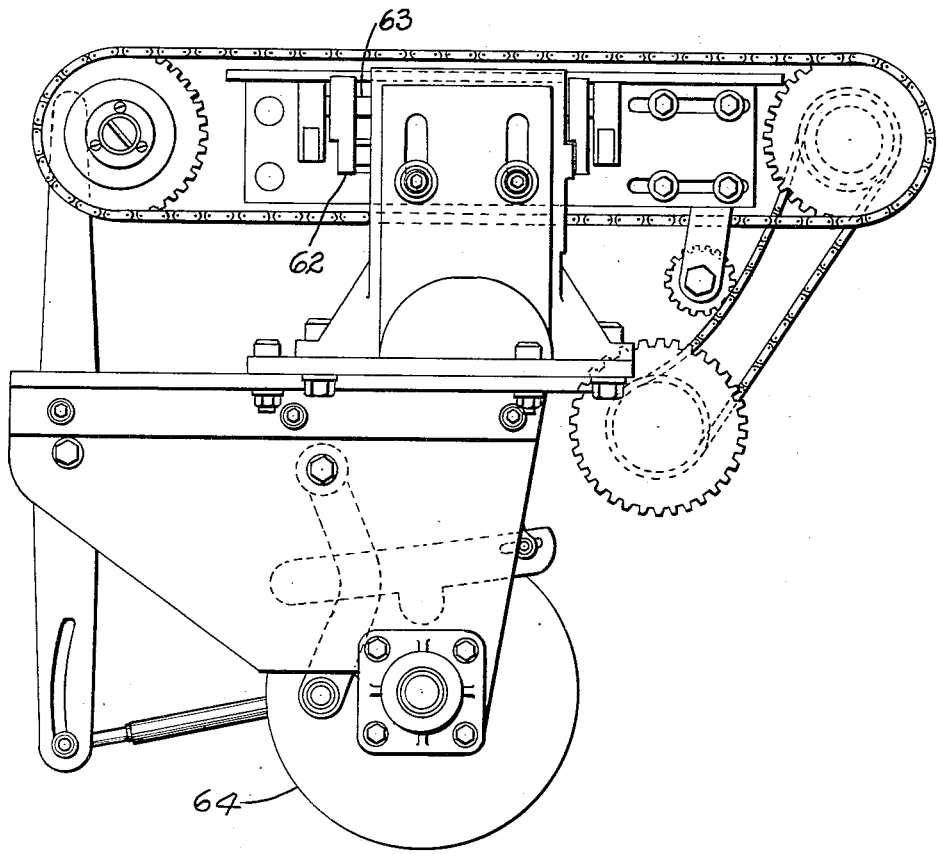
Fig. 7 is an enlarged side elevation detail of a modified form of locking mechanism embodying the present invention.

Figs. 7 and 8 illustrate a modified form of locking mechanism that may be employed to advantage for securing a wrapper blank W' arranged as shown in Fig. 9 for packaging a single row of articles and having retaining and locking tabs 56 and 57 formed for interlocking adjacent one side thereof and gripping apertures formed by slit flaps at 58 and 59, as disclosed in copending application Serial No. 602,968, filed August 9, 1956. The embodiment shown in Figs. 7 and 8 is arranged with a crosshead 60 to be actuated with a cyclic motion including a pivoting or oscillating rising component, rather than the vertically reciprocating motion employed in the previously described embodiment. For this purpose, the crosshead 60, which carries a finger element 61 (or elements), in substantially the same manner as in the previous embodiment but curved in this instance because of the pivoting motion, is mounted for horizontal sliding movement in a slideway structure 62 which is carried on a pivot axis at 63 aligned with the direction of horizontal movement allowed the crosshead 60 and spaced laterally of the finger element 61. In this case, too, cams 64 and 65 are provided to actuate the respective horizontal and pivoting motions of the crosshead 60 through suitable connecting linkages to effect the interlocking of the locking tab 57 for securing the wrapper W', the pivoting motion of the crosshead 60 operating advantageously to manipulate the sidewise located locking tab in this case.

Figs. 10, 11 and 12 illustrate a still further modified embodiment in which the crosshead 66 has a cyclic motion comparable to the embodiment shown in Figs. 7 and 8, but employs a double face cam structure 67 arranged horizontally at substantially the same level as the crosshead 66 to actuate the horizontal motion thereof from one cam face 68 through a connecting linkage as indicated at 69, and the pivoting crosshead motion from the other face 70 through a linkage at 71. Such an arrangement makes it possible to mount the actuating cam structure 67 at one side of the frame structure 10 so that it is readily accessible and disposed at a convenient height for adjustment in timing the crosshead motion properly, which affords a substantial operating advantage where the packaging apparatus must be changed over frequently for wrapping packages of different sizes.

It should also be noted that Fig. 10 shows in plan the form of cam track 46 employed for laterally shifting the wrapper tightening lug members as described in connection with the first embodiment above, the cam tracks 46 having tapered entrance end portions 72 for effecting the initial inward shift and terminating adjacent a pointed cam block 73 centered with respect thereto for shifting the lug members outwardly again to release the secured package group for discharge from the locking station.

The present invention has been described in detail above for purposes of illustration only and is not intended to be limited by this description or otherwise except as defined in the appended claims.

I claim:

1. Apparatus for packaging articles in a wrapper blank proportioned to fold over and overlap for securing beneath a package group of said articles and having apertures formed in the overlapping blank portions to allow gripping thereof for drawing said blank tight before it is secured, said apparatus comprising means for maintaining continuous travel of a package group of said articles enclosed by a wrapper blank folded over and overlapped beneath said group, a pair of endless chains trained with a top reach aligned at each side and just below the bottom of said continuously travelling wrapper enclosed package group, pin elements carried by each chain of said pair to extend laterally therefrom toward the other chain of said pair for alignment with said wrapper blank apertures below said continuously travelling package group, means for driving said pair of endless chains at a linear speed equal to that of said continuously travelling package group and with said pin elements aligned below said wrapper blank apertures, lug members slidably mounted on said laterally extending pin elements for shifting axially thereof and shaped for fitting within said wrapper blank apertures, and means for shifting said lug members laterally inward adjacent the starting end of the top reach of said chains and thereby drawing and maintaining said wrapper blank tight for securing about said continuously travelling package group.

2. Apparatus for packaging articles in a wrapper blank proportioned to fold over and overlap for securing beneath a package group of said articles and having apertures formed in the overlapping blank portions to allow gripping thereof for drawing said blank tight before it is secured, said apparatus comprising means for maintaining continuous travel of a package group of said articles enclosed by a wrapper blank folded over and overlapped beneath said group, a pair of endless chains trained with a top reach aligned at each side and just below the bottom of said continuously travelling wrapper enclosed package group, pin elements carried by each chain of said pair to extend laterally therefrom toward the other chain of said pair for alignment with said wrapper blank apertures below said continuously travelling package group, means for driving said pair of endless chains at a linear speed equal to that of said continuously travelling package group and with said pin elements aligned below said wrapper blank apertures, lug members slidably mounted on said laterally extending pin elements for shifting axially thereof and shaped for fitting within said wrapper blank apertures, and means positioning said lug members laterally on said pin elements for rising into said wrapper blank apertures at the starting end of the top reach of said chains and for then shifting laterally inward to draw and maintain said wrapper blank tight about said package group during continuous travel thereof along a substantial portion of the remaining extent of said top reach.

3. Apparatus for packaging cylindrical articles, such as cans, in a wrapper blank proportioned to fold over and overlap beneath a package group of said articles and having securing means formed by aligned locking and retaining tabs in the respective outer and inner overlapping blank portions arranged in alignment with the space between said articles in a packaged group resulting from the cylindrical form of said articles, with apertures also formed in said overlapping blank portions at locations within the diameters of articles in said package group for gripping and drawing said wrapper blank tight about said package group before securing said locking tabs; said apparatus comprising, in combination with means for maintaining continuous travel of a package group of said articles enclosed by a wrapper blank folded over and overlapped beneath said group, a pair of endless chains trained with a top reach aligned at each side and just below the bottom of a wrapper enclosed package group caused to travel continuously by said first mentioned means, means carried by each chain of said pair forming slideways extending laterally therefrom toward the other chain of said pair for alignment with said wrapper blank aperture below said continuously traveling package group, means for driving said pair of endless chains at a linear speed equal to that of said continuously traveling package group with said slideway forming means aligned below said wrapper blank apertures, lug members slidably mounted on said slideway forming means and shaped for fitting within said wrapper blank apertures, means positioning said lug members laterally of said slideway forming means for rising into said wrapper blank apertures at the starting end of the top reach of said chains and for then shifting laterally inward to draw and maintain said wrapper blank tight about said package group during travel thereof along a substantial portion of the remaining extent of said top reach, and means for pressing said locking tabs through the inner overlapping blank portion at said retaining tabs during continuous travel of said package group along the extent of said top reach at which said wrapper blank is maintained tight about said package group by said lug members.

4. Apparatus as defined in claim 3 and further characterized in that said last mentioned means comprises a crosshead member carrying finger elements spaced thereon in correspondence with the spacing of the locking tabs in said wrapper blank, and means imparting a cyclic motion to said crosshead member for following the continuous travel of said package group while raising said finger elements to press said locking tabs through said inner overlapping wrapper blank portions.

5. Apparatus as defined in claim 4 and further characterized in that the means imparting cyclic motion to said crosshead comprises a horizontally reciprocated member carrying said crosshead and vertically reciprocated means carrying said horizontally reciprocated member.

6. Apparatus as defined in claim 4 and further characterized in that the means imparting cyclic motion to said crosshead comprises a horizontally reciprocated member and means oscillating said crosshead on said member about an axis aligned with the motion of said member and spaced laterally of said finger elements.

7. Apparatus as defined in claim 6 and further characterized in that said member is reciprocated horizontally by an actuating linkage from one face of a double face cam means disposed horizontally at substantially the same level as said member, and said crosshead is oscillated by a second actuating linkage from the other face of said cam means.

8. Apparatus for packaging articles in a wrapper blank proportioned to fold over and overlap for securing beneath a package group of said articles and having apertures formed in the overlapping blank portions to allow gripping thereof for drawing said blank tight before it is secured, said apparatus comprising means for maintaining continuous travel of a package group of said articles enclosed by a wrapper blank folded over and overlapped beneath said group, and means movable in timed relation to the continuously travelling package group for gripping the overlapped portions of said wrapper blank at the apertures therein and drawing and maintaining the gripped wrapper blank tight for securing about said continuously traveling package group.

9. Apparatus for packaging articles in a wrapper blank proportioned to fold over and overlap for securing beneath a package group of said articles and having apertures formed in the overlapping blank portions to allow gripping thereof for drawing said blank tight before it is secured, said apparatus comprising means for maintaining continuous travel of a package group of said articles enclosed by a wrapper blank folded over and overlapped beneath said group, means movable in timed relation to the continuously travelling package group for gripping the overlapped portions of said wrapper blank at the apertures therein and drawing and maintaining the gripped wrapper blank tight about said package group while it travels continuously, and means having a cyclic motion and following the continuous travel of said package group for securing said overlapped blank portions while gripped and maintained tight by said second mentioned means and while continuous travel of said package group is maintained by said first mentioned means.

10. Apparatus for packaging cylindrical articles, such as cans, in a wrapper blank proportioned to fold over and overlap beneath a package group of said articles and having securing means formed by aligned locking and retaining tabs in the respective outer and inner overlapping blank portions arranged in alignment with the space between said articles in a package group resulting from the cylindrical form of said articles, with apertures also formed in said overlapping blank portions at locations within the diameters of articles in said package group for gripping and drawing said wrapper blank tight about said package group before securing said locking tabs; said apparatus comprising, in combination with means for maintaining continuous travel of a package group of said articles enclosed by a wrapper blank folded over and overlapped beneath said group, means for gripping the overlapped portions of said wrapper blank at the apertures therein and drawing and maintaining the gripped wrapper blank tight about said package group while it travels continuously, and means for inserting said locking tabs through the inner overlapping blank portion at the retaining tabs therein for engagement thereat to secure said wrapper blank about said package group while said overlapped blank portions are gripped and maintained tight by said second mentioned means and while continuous travel of said package group is maintained by said first mentioned means.

11. Apparatus for packaging cylindrical articles, such as cans, in a wrapper blank proportioned to fold over and overlap beneath a package group of said articles and having securing means formed by aligned locking tabs and openings in the respective outer and inner overlapping blank portions arranged in alignment with the space between said articles in a packaged group resulting from the cylindrical form of said articles; said apparatus comprising, in combination with means for maintaining continuous travel of a package group of said articles enclosed by a wrapper blank folded over and overlapped beneath said group, means for inserting said locking tabs through the inner overlapping blank portion at the openings therein, and means imparting a cyclic motion to said second means for following the continuous travel of said package group at the same linear speed as said package group while raising said second means to press said locking tabs through said inner overlapping wrapper blank portion at said openings.

12. Apparatus for packaging cylindrical articles as defined in claim 11 and further characterized in that said second means is formed by a member carrying finger elements spaced thereon in correspondence with the spacing of the locking tabs in said wrapper blank.

References Cited in the file of this patent

UNITED STATES PATENTS

| | | |
|---|---|---|
| 2,351,596 | Brogden et al. | June 20, 1944 |
| 2,603,924 | Currie et al. | July 22, 1952 |
| 2,751,730 | Gentry | June 26, 1956 |
| 2,770,935 | Nigrelli | Nov. 20, 1956 |